Jan. 12, 1926.                                    1,569,127
                    J. W. HOLT
              ELECTRIC WELDING MECHANISM
                 Filed Oct. 27, 1921
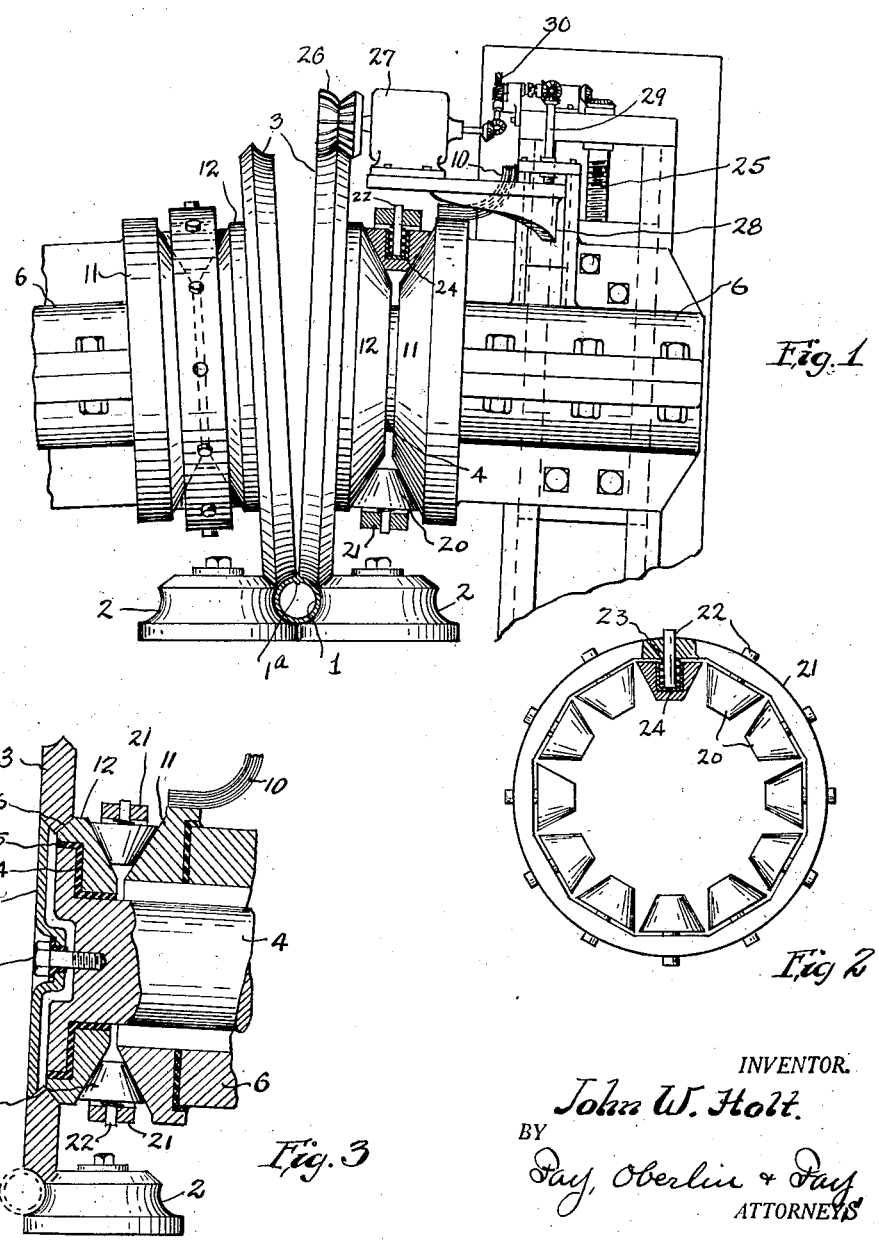
INVENTOR.
John W. Holt.
BY
Fay, Oberlin & Fay
ATTORNEYS Patented Jan. 12, 1926.

1,569,127

UNITED STATES PATENT OFFICE.

JOHN W. HOLT, OF CLEVELAND, OHIO.

ELECTRIC WELDING MECHANISM.

Application filed October 27, 1921. Serial No. 510,700.

*To all whom it may concern:*

Be it known that I, JOHN W. HOLT, a citizen of the United States, and a resident of Cleveland, county of Cuyahoga, and State of Ohio, have invented a new and useful Improvement in Electric Welding Mechanism, of which the following is a specification, the principle of the invention being herein explained and the best mode in which I have contemplated applying that principle, so as to distinguish it from other inventions.

In electric welding mechanism designed for butt welding the edges of preformed metal tubes after the fashion illustrated in United States Letters Patent No. 658,741 to O. Parpart, dated December 25, 1900, considerable difficulty has been encountered in preventing deterioration or wear of the bearings that support the electrode rolls due to the tendency of the welding current to flow through such bearings rather than directly through the rolls to the work. A further difficulty is encountered in preserving the proper profile of the rolls where they contact with the work adjacent the compression rolls which hold the abutting edges of the tube together, with the result that after a period of use such electrode rolls no longer properly contact with the corresponding portions of the tube.

One object of the present invention, accordingly, is to provide an improved support for the electrode rolls in a machine of the type in question in combination with novel means for conducting the current to such rolls. A further object is to provide an improved and more or less automatic arrangement whereby contacting pressure of such rolls may be preserved as they wear away and require to be adjusted towards the work.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a broken front elevational view of an electric welding machine embodying my present improvements; Fig. 2 is partly a side elevation and partly a central section of one of the elements of such machine that serve to support the electrode rolls therein and conduct the current to such rolls; and Fig. 3 is an axial section through one of the electrode rolls showing the insulating means employed.

The general arrangement of the operating parts of my improved welding mechanism need be only briefly described. The work, consisting of a preformed tube 1 or like article, is held with the edges thereof which are to be welded together in proper abutting relation by means of two pressure rolls 2, which may be positively driven to feed such work through, or such feeding may be accomplished by separate feed rolls (not shown) either acting alone or in conjunction with such pressure rolls. The welding electrodes 3 in themselves are of familiar design, consisting of annular disks, usually made of copper, and having their peripheral edges formed to contact with the work on either side of the seam $1^a$ therein, the work being guided so as to expose such seam midway between the pressure rolls 2. The upper faces of the latter, it will be observed, are bevelled and the peripheral edges of the electrode rolls are formed with a complementary bevel, as well as with a transversely concaved section that conforms to the curvature of the work.

The opposed faces of the electrode rolls are preferably inclined at a slight angle to a vertical line passing centrally through the work so as to afford proper clearance, and the axes of said rolls are correspondingly inclined with respect to a horizontal line. In view of the fact that the rolls must press on the work in an endwise, i. e. axial direction, as well as edgewise or transversely of their faces, spindles 4, whereby they are supported, are of substantial construction and may be formed with a shoulder (not shown), or other means to take up endthrust. Each of the bearings 6, in which such spindles are journaled, is slidably or otherwise so mounted in the general frame of the machine as to be adjustable in a direction at right angles to the corresponding spindle, and said bearings may also be adjustable longitudinally of such axis.

The transformer with the secondary coil to which the electrode rolls require to be connected in series, is located directly above the mounting, including the bearings 6, in which the respective spindles 4 are journaled, and provision is made, as will now be described, for the direct passage of the current from such secondary to the respective disks that constitute the electrode rolls. A ring 11 having a circular outwardly beveled face 11 is provided directly back of the corresponding electrode roll, and attached to the latter is another ring 12 formed with a complementary beveled face, such rings 11 and 12 being of conducting material, e. g. copper, just like the electrode roll. Both of said rings will be separated by suitable insulation from the spindle 4, but the ring 12 will of course have electrical contact with such roll. One method of securing such insulating effect is shown in Fig. 3, where it will be seen that the front end of the spindle 4 is stepped or formed with a shoulder 14, from which the ring 12 is separated by means of a layer of insulation 15, while the face 16 of such ring that contacts with the electrode roll is beveled to fit against a corresponding beveled face on the latter. A plate 17 has similar beveled or wedging engagement with the outer face of the electrode roll so that when such plate is drawn inwardly by means of the set bolt 18 that secures it to the spindle 4, the roll will be secured firmly in place and held in close fitting contact with ring 12.

The ring 11 may be connected in any suitable manner with the secondary of the transformer (not shown). Thus either a sliding contact, or else a flexible lead 10 as illustrated in Figs. 1 and 3, may be employed for this purpose, as need not be described in detail. This allows the bearings of spindle 4 to be insulated so that no current can pass therethrough; in other words, the path of the welding current lies entirely outside of such bearings.

For conducting the current from the ring 11 to such ring 12, I dispose in the V-shaped annular groove between the two members in question a series of conical rollers 20 carried by a floating ring or annulus 21, best shown in detail in Fig. 2. Said rollers are of conducting material like the parts wherewith they co-operate, and they are provided in sufficient number to provide an adequate current carrying capacity. Said rollers 20 are preferably mounted on pins 22, projecting radially inwardly from the ring 21, and compression springs 23 surrounding said pins force the rollers towards the axis of the ring, a bearing bushing 24 being interposed between each such spring and the corresponding roller which is socketed to receive such bushing.

The invention also includes, as previously indicated, a profiling attachment whereby the straight and curved beveled faces of the edge of the periphery of each electrode roll are automatically milled or ground to proper contour as such electrode roll is adjusted towards the work following the wearing away of such edge. For thus adjusting the roll towards the work, a screw 25, held in the main frame of the machine, and engaging housing 6 that supports the bearing of spindle 4 is provided, while for the purpose of profiling the electrode roll a suitable cutter 26 is mounted on the spindle of a small electric motor 27 that is carried on a slide 28 adjustable on said housing in a corresponding direction, i. e., parallel with said screw 25. Said slide 28 is positioned by means of a second screw 29 that is interconnected with screw 25 the slide 28 will be moved an appropriate amount. The motor 27 will be set in operation during such adjustment of the screws and the periphery of the electrode roll will thus be automatically and accurately retrimmed without the necessity of demounting the disk from the spindle, which not only entails a loss of time, but when thus dismounted it is quite difficult to accurately reset after same has been trimmed, as will be readily understood. More important, the proper pressure of the electrode rolls on the work, once determined, can be preserved indefinitely, since the trimming of such rolls and their adjustment towards the work are simultaneously effected and properly correlated by the means just described.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In electric welding mechanism, the combination of a support, a shaft journaled therein, an electrode roll mounted on one end of said shaft, and means for conducting electric current to said roll without passing through said shaft, said means including a plurality of members acting to support said roll having rolling contact therewith at symmetrically disposed circumferentially spaced points.

2. In electric welding mechanism, the combination of a support, a shaft journaled therein, an electrode roll mounted on one end of said shaft, and means for conducting electric current to said roll without passing through said shaft, said means including a conductor ring concentric with and adjacent one side of said roll, and a plurality of members interposed between said roll and ring and having rolling contact therewith.

3. In electric welding mechanism, the combination of a support, a shaft journaled therein, an electric roll mounted on one end of said shaft, and means for conducting electric current to said roll without passing through said shaft, said means including a conductor ring concentric with and adjacent one side of said roll, the juxtaposed faces of said roll and ring being beveled outwardly in opposite directions, and a plurality of conical members interposed between said roll and ring and having rolling contact therewith.

4. In electric welding mechanism, the combination of a support, a shaft journaled therein, an electric roll mounted on one end of said shaft, and means for conducting electric current to said roll without passing through said shaft, said means including a conductor ring concentric with and adjacent one side of said roll, the juxtaposed faces of said roll and ring being beveled outwardly in opposite directions, a floating annulus located between said roll and ring, and a plurality of radially disposed conical rollers carried by said annulus and contacting with the beveled faces of said roll and ring.

5. In electric welding mechanism, the combination of a support, a shaft journaled therein, an electric roll mounted on one end of said shaft, and means for conducting electric current to said roll without passing through said shaft, said means including a conductor ring concentric with and adjacent one side of said roll, the juxtaposed faces of said roll and ring being beveled outwardly in opposite directions, a floating annulus located between said roll and ring, a plurality of radially disposed conical rollers carried by said annulus and contacting with the beveled faces of said roll and ring; and resilient means associated with said rollers tending to force the same inwardly.

6. In mechanism of the character described, the combination of means adapted to feed a tubular piece of work, an electrode roll adapted to contact with such work and adjustable relatively thereto take up for wear, and a profiling device co-operative with the work-contacting portion of said roll, said device being adjustable conjointly with said roll in predetermined ratio.

7. In mechanism of the character described, the combination of means adapted to feed a tubular piece of work, an electrode roll adapted contact with such work and adjustable relatively thereto to take up for wear, a rotary profiling cutter co-operative with the work-portion of said roll, and interconnected feeding means for said roll and cutter whereby the latter is advanced towards the roll when such roll is adjusted towards the work.

8. In electric welding mechanism, the combination of a support, a shaft journaled therein, an electrode roll mounted on said shaft, and means including a series of rolling contacts for conducting electric current to said roll.

9. In mechanism of the character described, the combination of a support, a shaft journaled therein and formed with a shoulder, a ring of conducting material adjacent such shoulder, such ring having its outer face beveled, a layer of insultation interposed between such ring and shoulder, an electrode roll in the form of an annular disk having its inner edge oppositely beveled, the inner beveled surface of said roll being adapted to contact with the beveled face of said ring, and a plate secured to the end of said shaft and having wedging engagement with the outer beveled face of said roll.

Signed by me, this 21st day of October, 1921.

JOHN W. HOLT.